US006424116B1

(12) United States Patent
Okuyama et al.

(10) Patent No.: US 6,424,116 B1
(45) Date of Patent: Jul. 23, 2002

(54) CORE MEMBER, CORE ASSEMBLY, CHARGING PORT AND INDUCTION-TYPE CHARGING APPARATUS

(75) Inventors: Yasukazu Okuyama; Shinichiro Ito; Yasuhiro Sakurai, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/729,265

(22) Filed: Dec. 5, 2000

(30) Foreign Application Priority Data

Dec. 6, 1999 (JP) .......................................... 11-346777

(51) Int. Cl.[7] .............................................. H01M 10/48
(52) U.S. Cl. ...................................................... 320/108
(58) Field of Search ................................ 320/107, 108, 320/109; 336/DIG. 2

(56) References Cited

U.S. PATENT DOCUMENTS 6,310,465 B2 * 10/2001 Najima ........................ 320/108
6,320,352 B2 * 11/2001 Terazoe ...................... 320/108

FOREIGN PATENT DOCUMENTS

| | | |
|---|---|---|
| JP | 7-220961 | 8/1995 |
| JP | 11-206029 | 7/1999 |
| JP | 11-285156 | 10/1999 |
| JP | 2000-133535 | 5/2000 |

* cited by examiner

*Primary Examiner*—Gregory Toatley
(74) *Attorney, Agent, or Firm*—Oblon, Spivak, McClelland, Maier & Neustadt, P.C.

(57) ABSTRACT

The present invention provides a core member and a core assembly that realize a compact and lightweight charging port and a compact and lightweight induction-type charging apparatus. A first side end of a bottom plate portion includes inclined side ends receding from the first side end toward a point between a first side end and a second side end and halfway between a third side end and a fourth side end. A middle leg portion extends from a top surface of the bottom plate portion offset toward side ends opposite the first side ends, relative to a center of the bottom plate portion. Two outer leg portions extend from the top surface of the bottom plate portion along side ends other than the first and second side ends, and have top surfaces which are higher than a top surface of the middle leg portion.

32 Claims, 13 Drawing Sheets

CORE MEMBER, CORE ASSEMBLY, CHARGING PORT AND INDUCTION-TYPE CHARGING APPARATUS

BACKGROUND OF THE INVENTION

1. Field of the Invention

The present invention relates to a core member, a core assembly, a charging port and an induction-type charging apparatus.

2. Description of the Related Art

A typical example of induction-type charging apparatuses employed to charge the batteries in electric cars is disclosed in Japanese Unexamined Patent Publication No. 1995-220961. In the induction-type charging apparatus disclosed in this prior art, a charging coupling device is inserted in a charging port to cause inductive coupling between the charging port and the charging coupling device so that electrical energy to be utilized for charging is supplied from the charging coupling device to the charging port. The charging port includes a secondary core and a secondary winding, whereas the charging coupling device includes a primary core and a primary winding. A gap at which the charging coupling device is to be inserted is provided in advance at the secondary core of the charging port, and by inserting the charging coupling device in this gap, inductive coupling is induced between the charging port and the charging coupling device.

The charging port assumes a structure achieved by inserting the secondary core having the secondary winding inside a case. The secondary core is constituted of an EE core. The EE core achieves a roughly rectangular planar shape.

As mentioned above, the primary application of this type of induction-type charging apparatus is in battery charging in electric cars and in such an application, the charging port is securely mounted near a car battery where other parts also being mounted in close proximity and space is limited. For this reason, it is crucial to miniaturize the charging port as much as possible.

However, since the secondary core constituted of the EE core having a roughly rectangular planar shape and wound with the secondary winding is inserted inside the case of the charging port in the prior art, the EE core can be only pushed in the case as far as the position at which an external circumferential surface of the secondary winding comes in contact with the inner wall surface of the case. This results in a large dead space formed at the far end inside the case and in particular, at the corners of the far end and, thus, the need for miniaturization cannot be satisfied.

SUMMARY OF THE INVENTION

It is an object of the present invention to provide a core member and a core assembly that make it possible to realize a charging port and a induction-type charging apparatus which are compact and lightweight.

It is a further object of the present invention to provide a charging port and a induction-type charging apparatus which are compact and lightweight.

In order to achieve the objects described above, the core member according to the present invention comprises a bottom plate portion, a middle leg portion and two outer leg portions. The bottom plate portion has a first direction Y and a second direction perpendicular to the first direction Y. The bottom plate portion has a first side end and a second side end opposing each other in the first direction Y and a third side end and a fourth side end opposing each other in the second direction. The first side end includes inclined side ends which recede from the first side end toward a point which is between the first side end and the second side end and halfway between the third side end and the fourth side end.

The middle leg portion extends from a top surface of the bottom plate portion in a third direction perpendicular to the first direction Y and the second direction, and is offset toward the second side end relative to the center of the bottom plate portion.

The two outer leg portions extend from the top surface of the bottom plate portion in the third direction, along the third side end and the fourth side end, and have top surfaces that are higher than the top surface of the middle leg portion.

The core member described above is used to constitute a charging port in an induction-type charging apparatus. More specifically, two core members are combined together to constitute a core assembly, and the core assembly with a winding wound around the middle leg portion of the core assembly is inserted into the case.

In this structure, at least one of the two core members constituting the core assembly is the core member according to the present invention. In the core member according to the present invention, a gap which allows a charging coupling device to be inserted therein is formed between the middle leg portion and the other core member since the top surfaces of the outer leg portions are set higher than the top surface of the middle leg portion. As a result, the charging coupling device can be inserted into this gap. Since the winding is wound around the middle leg portion of the core assembly, inductive coupling can be induced between the winding wound around the middle leg portion of the core assembly and a winding provided at the charging coupling device via the core assembly, to inductively couple the charging coupling device with the charging port.

In addition, in the core member according to the present invention, the first side end includes inclined side ends which recede from the first side end toward a point which is between the first side end and the second side end and halfway between the third side end and a fourth side end, and the middle leg portion is offset toward the second side end relative to the center of the bottom plate portion. Consequently, the first side end of the bottom plate portion facing opposite the second side end is made to recede relative to the position of the middle leg portion at which the winding is provided. Thus, the core members are housed inside the case by effectively utilizing the space available within the case and achieve miniaturization of the overall case.

Furthermore, since the outer leg portions are provided independently of each along the third side end and the fourth side end of the bottom plate portion, radiation of heat is promoted by utilizing the space between them. As a result, the core volume can be reduced which achieves further miniaturization and a reduction in weight.

At the bottom plate portion, the second side end may be a straight side end. By adopting this mode, the cross sectional area of the bottom plate portion extending from the middle leg portion to the two outer leg portions is increased, making it possible to prevent magnetic saturation which achieves further miniaturization.

DETAILED DESCRIPTION OF THE PREFERRED EMBODIMENTS

Figure 1:
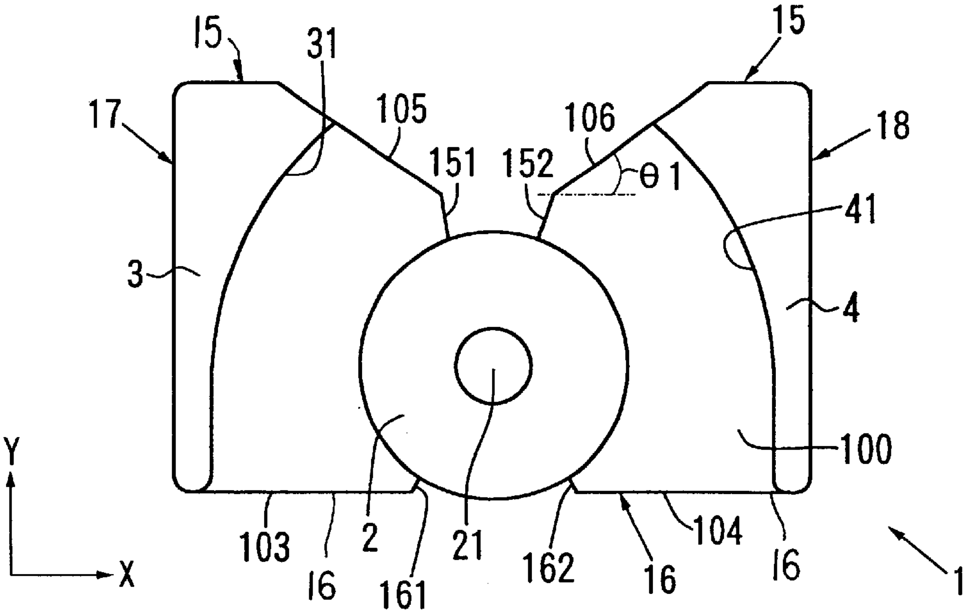
FIG. 1 is a plan view of the core member according to the present invention.
Figure 2:
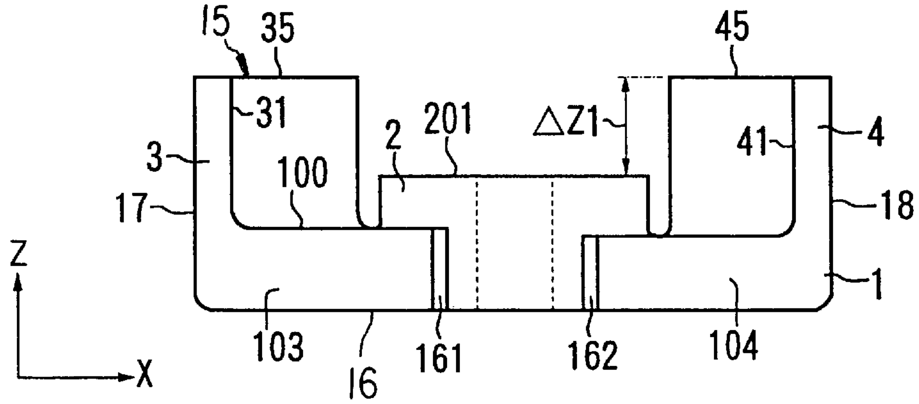
FIG. 2 is a front view of the core member shown in FIG. 1.

In the embodiment shown in FIGS. 1 and 2, a molded ferrite core member includes a bottom plate portion 1, a middle leg portion 2 and two outer leg portions 3 and 4.

The bottom plate portion 1 has a first direction Y and a second direction X perpendicular to the first direction Y. The bottom plate portion 1 has a first side end 15 and a second side end 16 opposing each other in the first direction Y and a third side end 17 and a fourth side end 18 opposing each other in the second direction X. The first side end 15 includes inclined side ends 105 and 106 which recede at an angle θ1 from the first side end 15 toward a point which is between the first side end 15 and the second side end 16 and halfway between the third side end 17 and the fourth side end 18.

The angle θ1 does not need to be set at the value illustrated in FIG. 1, and may be set larger or smaller. In the embodiment presented in the figures, the second side end 16 includes side ends 103 and 104 which are linear and separated from each other by the middle leg portion 2. Ends 161 and 162 of the side ends 103 and 104 are set over a distance from each other to lie continuous to the external circumferential surface of the middle leg portion 2. The inclined side ends 105 and 106 are separated from each other by the middle leg portion 2. Ends 151 and 152 of the inclined side ends 105 and 106 are set over a distance from each other to lie continuous to the external circumferential surface of the middle leg portion 2.

The middle leg portion 2 extends from a top surface 100 of the bottom plate portion 1 in a third direction Z perpendicular to the first direction Y and the second direction X. While the middle leg portion 2 has a round lateral cross sectional shape in the embodiment, it may assume another shape. The middle leg portion 2 is offset toward the side ends 103 and 104 of the second side end 16, relative to the center of the bottom plate portion 1. The middle leg portion 2 has a sectional area, the size of which does not allow magnetic saturation to occur during actual use. In the embodiment, a hole 21 is provided at the center of the middle leg portion 2. This hole 21 may be omitted.

The two outer leg portions 3 and 4 extend from the top surface 100 of the bottom plate portion 1 in the third direction Z, along the third side end 17 and the fourth side end 18, and have top surfaces 35 and 45 that are higher than the top surface 201 of the middle leg portion 2. The difference in height between the top surfaces 35 and 45 of the two outer leg portions 3 and 4 and the top surface 201 of the middle leg portion 2 is indicated with ΔZ1. In addition, the outer leg portions each have inner surfaces 31 and 41 which extend in the first direction Y and include at least a portion that is formed in a circular arc shape so that a radius of a winding (to be detailed later) wound around the middle leg portion 2 corresponds with the shape of the inner surfaces 31 and 41 of the outer leg portions 3 and 4.

Figure 3:
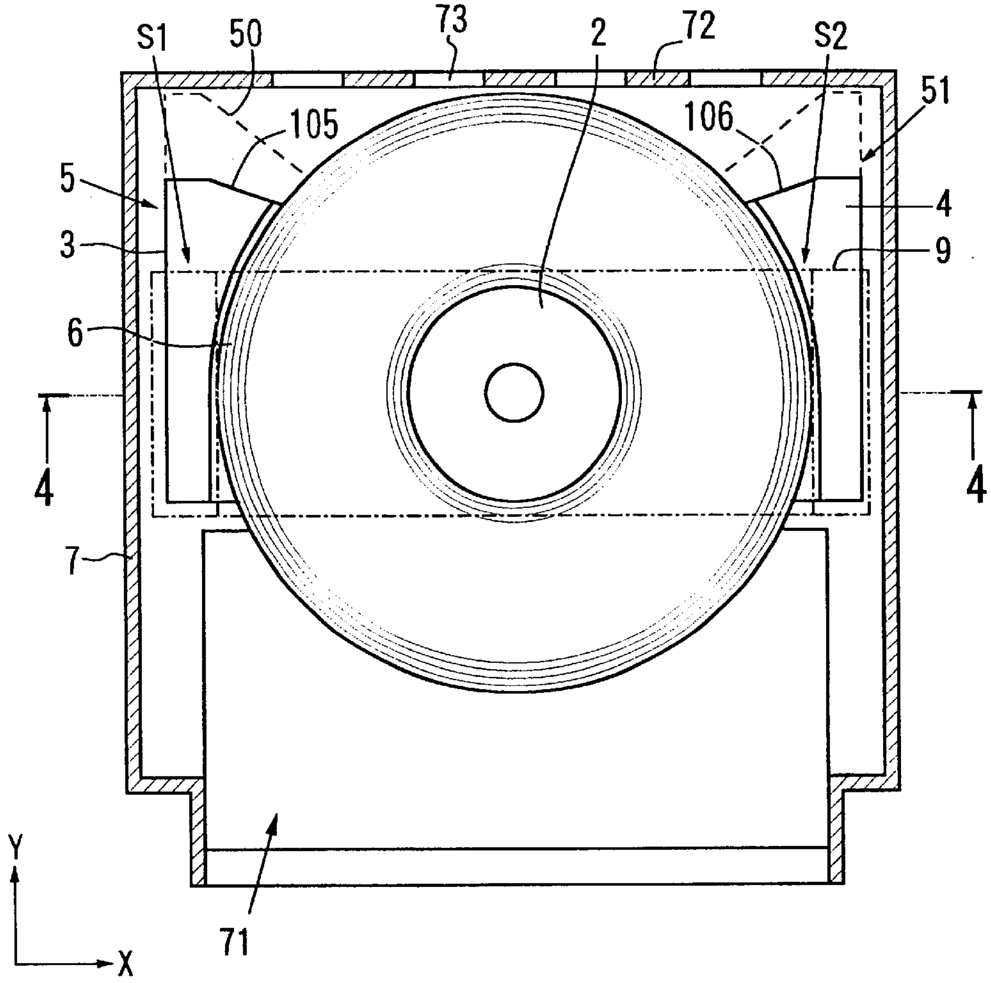
FIG. 3 is a sectional plan view of the charging port according to the present invention constituted by using two core members shown in FIGS. 1 and 2.
Figure 4:
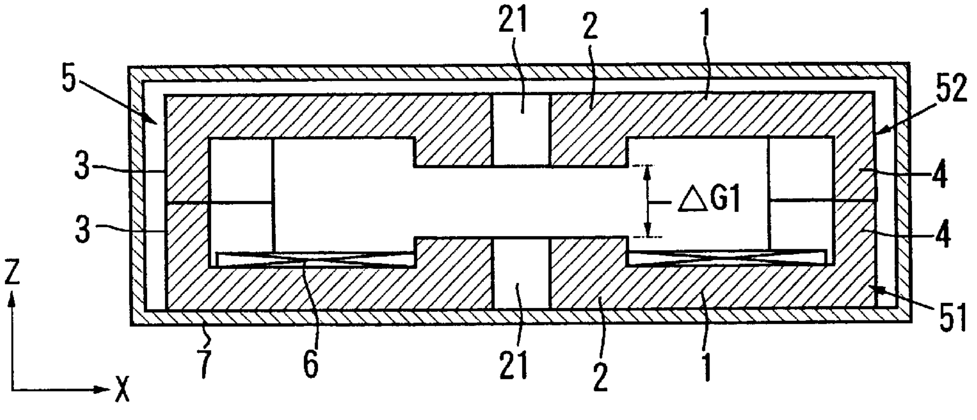
FIG. 4 is a sectional view taken along line 4—4 of FIG. 3.

FIG. 3 is a sectional plan view of the charging port according to the present invention and FIG. 4 is a sectional view taken along line 4—4 in FIG. 3. This charging port outputs electrical energy by receiving an electrical energy supply as it is inductively coupled with a charging coupling device (to be detailed later), and includes a core assembly 5, a winding 6 and a case 7.

The core assembly 5 includes a first core member 51 and a second core member 52. The first core member 51 and the second core member 52 are combined with each other to constitute a magnetic circuit. At least either one of the first core member 51 and the second core member 52 is constituted of the core member shown in FIGS. 1 and 2. In the embodiment, the first core member 51 and the second core member 52 are each constituted of the core member shown in FIGS. 1 and 2. The first core member 51 and the second core member 52 are assembled so as to allow the middle leg portions 2 of each core and the outer leg portions 3 and 4 of each core to face opposite each other.

The winding 6 is wound around the middle leg portion 2 of the first core member 51. The number of turns of the winding 6 is determined by taking into consideration the transformation ratio relative to a charging coupling device and the current capacity. Normally, the winding 6 is wound over several turns. The winding 6 may be provided at the middle leg portion 2 of the second core member 52, instead. The case 7 houses the core assembly 5 and the winding 6.

In this structure, at least one of the two core members 51 and 52 constituting the core assembly 5 is constituted of the core member according to the present invention shown in FIGS. 1 and 2. Since the top surfaces 35 and 45 of the outer leg portions 3 and 4 at the first core member 51 are set higher than the top surface 201 of the middle leg portion 2 (see FIG. 2), a gap ΔG1 at which the charging coupling device is to be inserted is formed between the middle leg portions 2 of the first and second core members 51 and 52. Thus, the charging coupling device can be inserted inside the gap ΔG1.

In the embodiment in which the first core member 51 and the second core member 52 are each constituted of the core member shown in FIGS. 1 and 2, the gap ΔG1 ranges over a distance which is approximately twice the difference ΔZ1 between the height of the top surfaces 35 and 45 of the outer leg portions 3 and 4 and the top surfaces 201 of the middle leg portions 2.

In addition, since the winding 6 is wound around the middle leg portion 2 of the core assembly 5, inductive coupling is induced via the core assembly 5 between the winding 6 provided at the middle leg portion 2 of the core assembly 5 and a winding provided at the charging coupling device, to inductively couple the charging coupling device with the charging port. The coupling structure achieved between the charging port and the charging coupling device is to be explained in further detail later.

Furthermore, the bottom plate portions 1 at the first core member 51 and the second core member 52 each include the inclined side ends 105 and 106 which recede at an angle θ1 from the first side end 15 toward a point which is between the first side end 15 and the second side end 16 and halfway between the third side end 17 and the fourth side end 18. Since the middle leg portion 2 is positioned offset toward the side ends 103 and 104 relative to the center of the bottom plate portion 1, the inclined side ends 105 and 106 which face opposite the side ends 103 and 104 are made to recede relative to the position of the middle leg portion 2, at which the winding 6 is provided. Thus, the core assembly 5 is housed inside the case 7 by effectively utilizing the space created at the far end within the case 7, to achieve overall miniaturization of the case 7.

This point may be explained with further clarity by comparing the embodiment with an example of the prior art in which an EE core having a roughly rectangular planar shape is utilized. In FIG. 3, chain line 9 indicates the roughly rectangular planar shape of an E-type core of the prior art, and the position at which it is provided. The middle leg portion 2 is set at the same position as that at which the middle leg portion 2 is provided in the core member according to the present invention. Since the E-type core indicated with chain line 9 with the winding 6 provided at its middle leg portion 2 is inserted in the case 7 in the prior art, the E-type core can be pushed only as far as the position at which the external circumferential surface of the winding 6 comes in contact with the internal wall surface of the case 7. Thus, large dead spaces S1 and S2 are created inside the case 7 and, more specifically, at the corners, which makes it impossible to meet the need for miniaturization.

In contrast, by using the core member 51 according to the present invention, the spaces S1 and S2 created at the far end in the case 7 can be utilized to house the rear end of the core assembly 5, making it possible to miniaturize the case 7. Compared to the prior art, the volume of the case can be reduced by approximately 30%. The position indicated by the dotted line 50 represents the ultimate position that may be taken by the core member 51.

In an embodiment in which the side ends 103 and 104 are provided linearly, the sectional area is increased at the portion of the bottom plate portion 1 extending from the middle leg portion 2 to the outer leg portions 3 and 4 compared to a structure in which the side ends 103 and 104 are made to incline along the same directions as the side ends 105 and 106 and, as a result, the magnetic flux density at which magnetic saturation occurs can be increased, thereby making it possible to achieve further miniaturization.

In addition, since the outer leg portions 3 and 4 are provided on the top surface 100 of the bottom plate portion 1 independently of each other, the radiation of heat is promoted by utilizing the open space between the outer leg portions 3 and 4. As a result, the core volume can be reduced to achieve further miniaturization and a further reduction in weight. It is to be noted that in terms of the core weight, a reduction of approximately 20% is achieved compared to the prior art. Heat radiation can be further improved by providing air holes 73 at a face plate 72 at the far end of the case 7.

Figure 5:
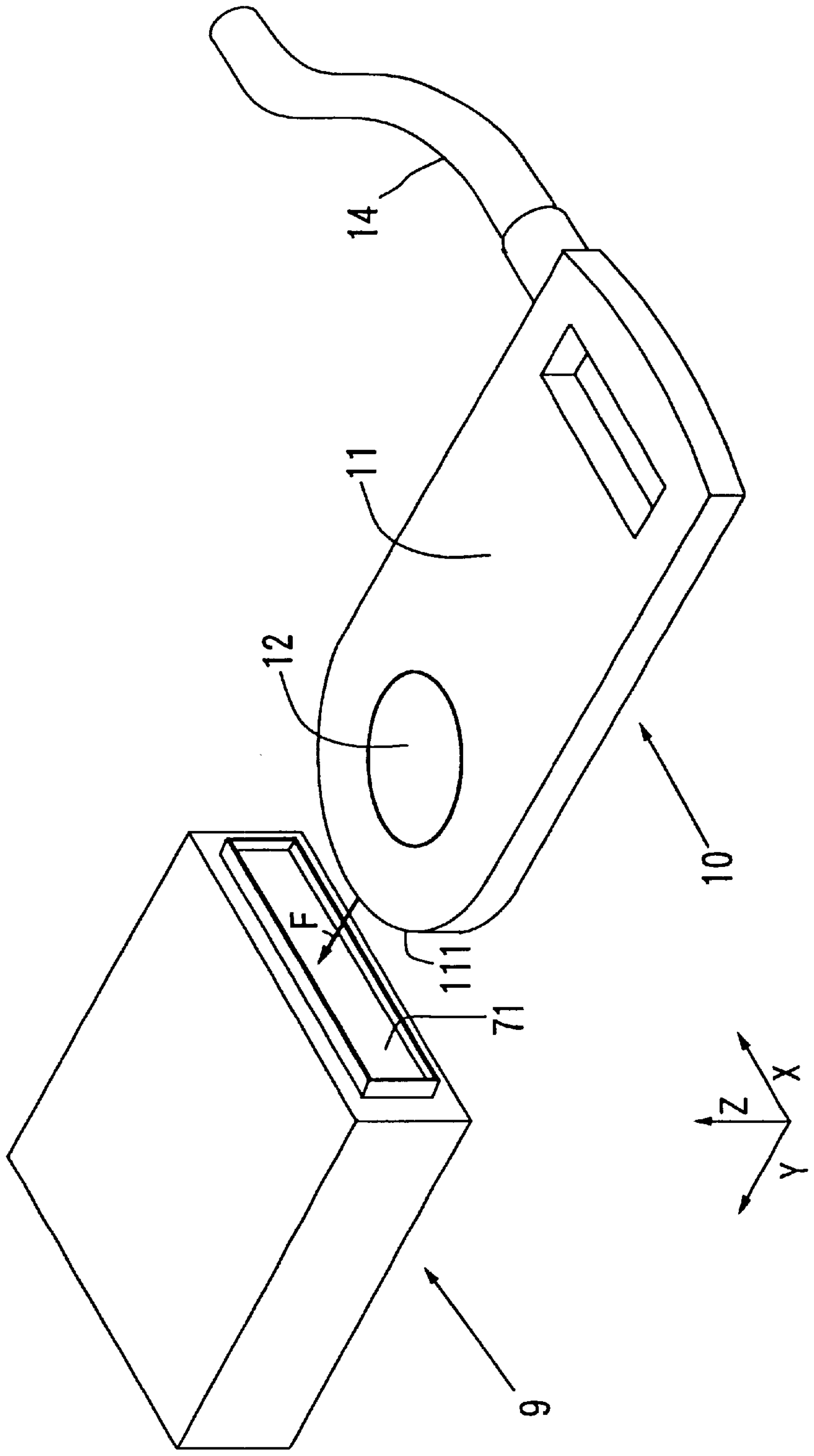
FIG. 5 is a perspective of the induction-type charging apparatus according to the present invention achieved by combining the charging port shown in FIGS. 3 and 4 with a charging coupling device.
Figure 6:
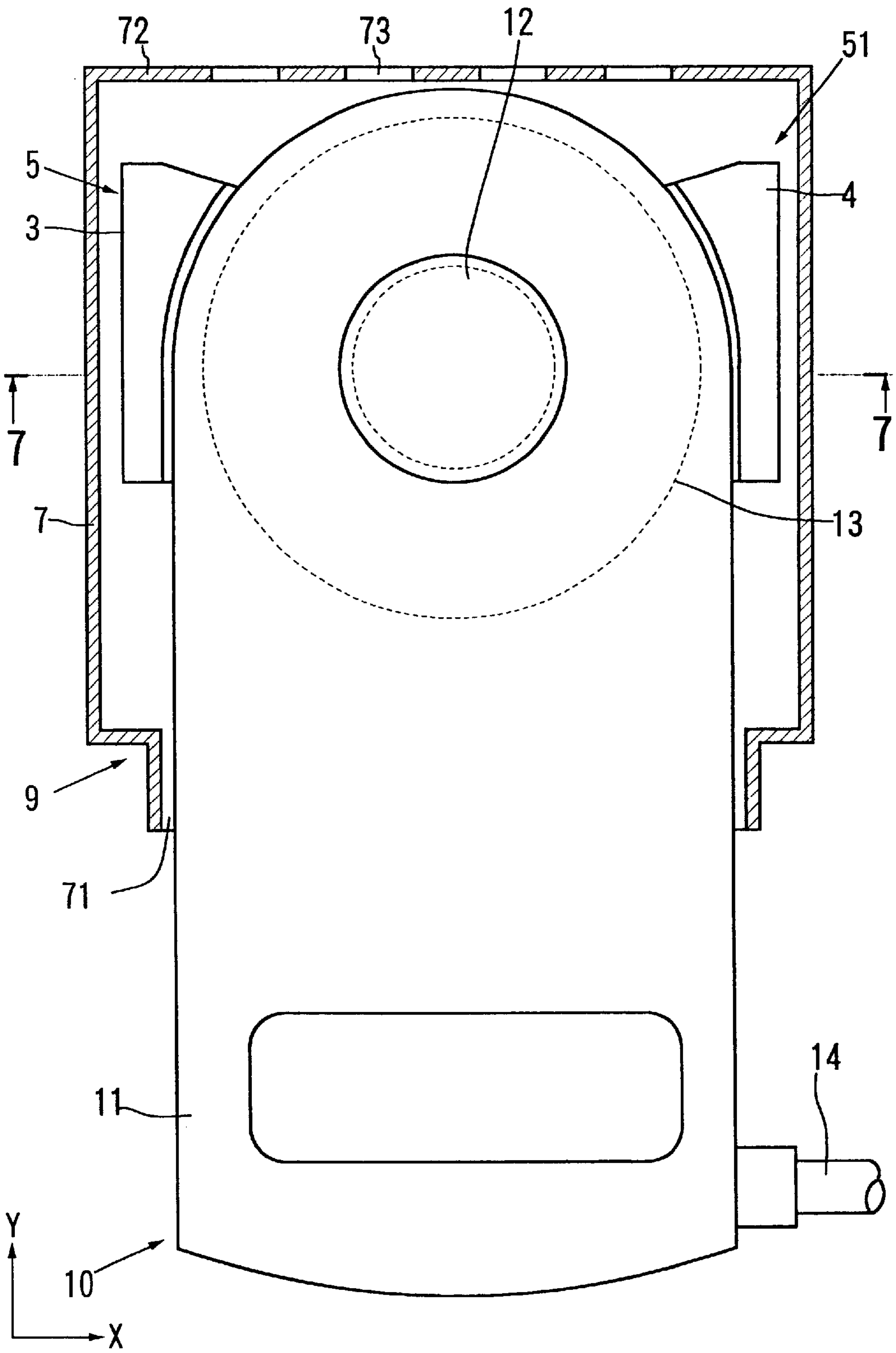
FIG. 6 is a sectional plan view in an enlargement of a portion of the induction-type charging apparatus shown in FIG. 5.
Figure 7:
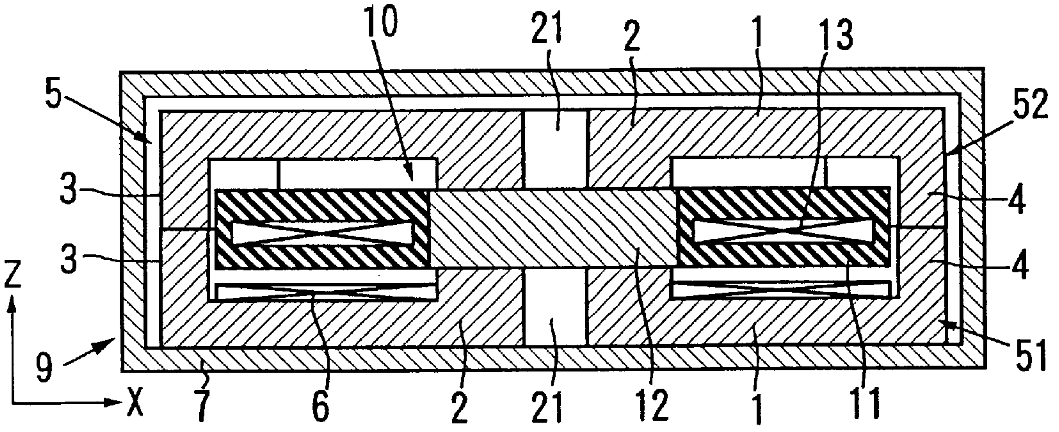
FIG. 7 is a sectional view taken along line 7—7 of FIG. 6.

FIG. 5 is a perspective of the induction-type charging apparatus according to the present invention achieved by combining the charging port shown in FIGS. 3 and 4 with a charging coupling device, FIG. 6 presents a partially enlarged sectional plan view of the induction-type charging apparatus shown in FIG. 5, and FIG. 7 is a sectional view taken along line 7—7 in FIG. 6. As shown in the figures, the induction-type charging apparatus according to the present invention is provided with a charging port 9 and a charging coupling device 10. The charging port 9 is constituted of the one shown in FIGS. 3 and 4, and FIGS. 1 and 2 should be referred to for details of the core members 51 and 52 constituting the charging port 9.

The charging coupling device 10 supplies electrical energy to the charging port 9 through inductive coupling. A main unit 11 of the charging coupling device 10, which is constituted of a non-magnetic material, has its external circumferential end 111 at the front formed in a circular arc shape. A core member 12 is mounted almost coaxially to this circular arc, with a winding 13 (primary winding) wound around the core member 12. Two ends of the winding 13 are connected to, for instance, a high-frequency source (not shown) via a cord 14 or the like.

When mounting the charging coupling device 10 at the charging port 9, its front end 111 should be inserted in the charging port 9 through an opening 71 of the case 7 constituting the charging port 9 as indicated by the arrow F. The core member 12 wound with the winding 13 is inserted within the gap ΔG1 created between the middle leg portions 2 at the core assembly 5 of the charging port 9, thereby constituting an inductively coupled mechanism (transformer) between the charging port 9 and the charging coupling device 10, to allow power to be transmitted from the charging coupling device 10 to the charging port 9.

Figure 8:
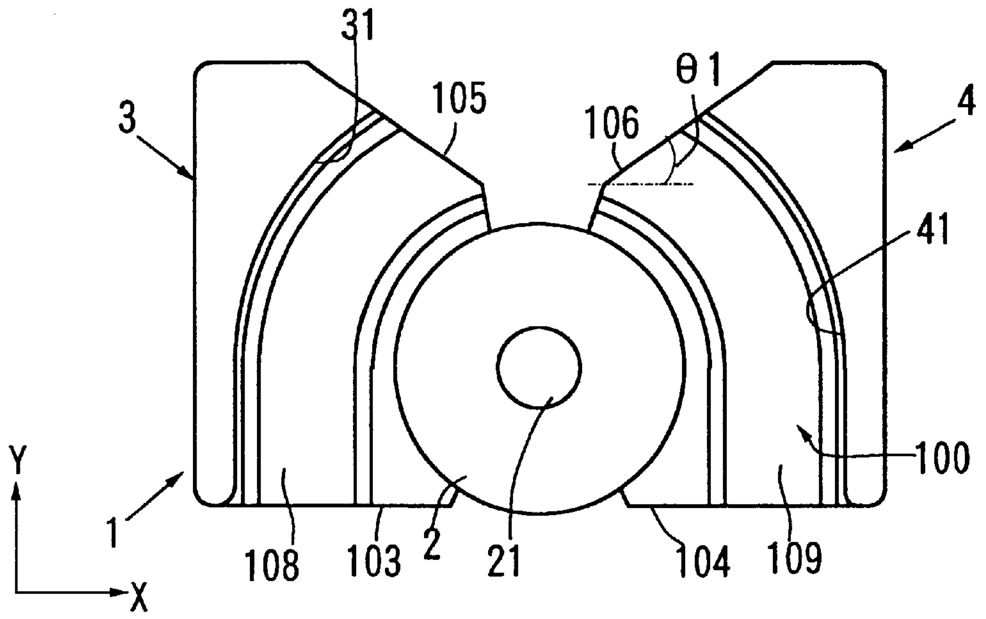
FIG. 8 is a plan view of the core member in another embodiment of the present invention.
Figure 9:
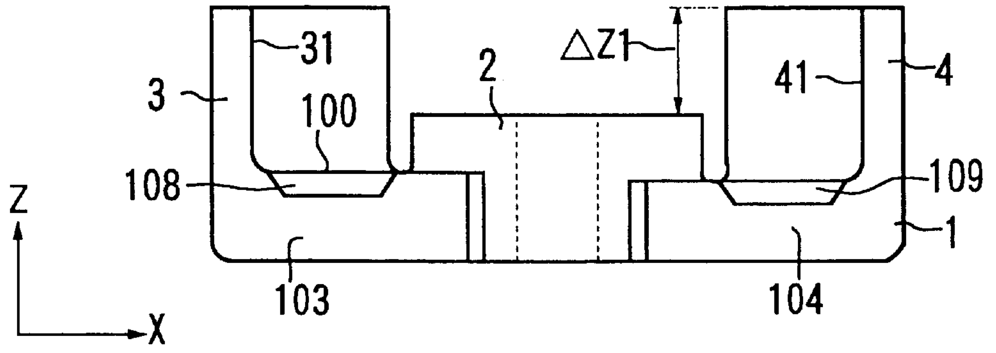
FIG. 9 is a front view of the core member shown in FIG. 8.

FIG. 8 is a plan view of another embodiment of the core member according to the present invention and FIG. 9 is a front view of the core member shown in FIG. 8. In the figures, the same reference numbers are assigned to components identical to those shown in FIGS. 1 and 2. This embodiment is characterized in that indented grooves 108 and 109 are provided at the top surface 100 of the bottom plate portion 1. The indented grooves 108 and 109 include circular arcs around the middle leg portion 2.

Figure 10:
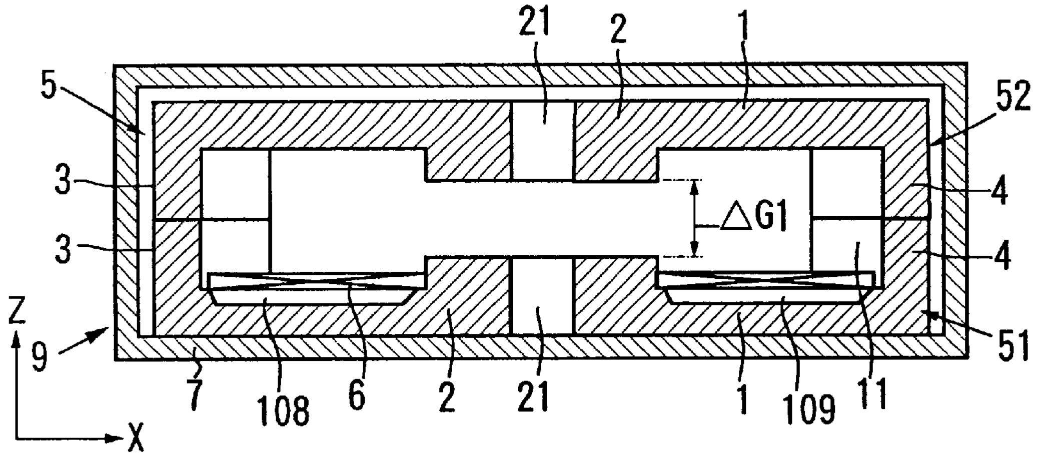
FIG. 10 is a sectional view of the charging port according to the present invention achieved by using the core member shown in FIGS. 1 and 2 and the core member shown in FIGS. 8 and 9.

FIG. 10 presents a sectional view of a charging port achieved by utilizing the core members shown in FIGS. 1, 2, 8 and 9. In the embodiment shown in FIG. 10, the core member shown in FIGS. 8 and 9 constitutes the first core member 51 and the core member shown in FIGS. 1 and 2 constitutes the second core member 52. Since the first core member 51 has the indented grooves 108 and 109 extending around the middle leg portion 2 at the top surface 100 of the bottom plate portion 1, a heat radiation space is created by the indented grooves 108 and 109 between the winding 6 wound around the middle leg portion 2, and the bottom plate 1.

Figure 11:
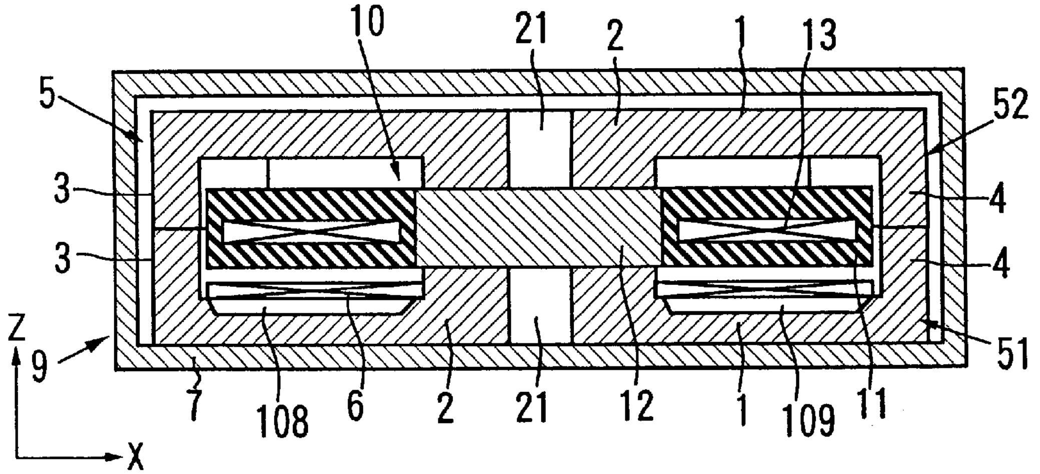
FIG. 11 is a sectional view of the induction-type charging apparatus according to the present invention constituted by combining the charging port shown in FIG. 10 with a charging coupling device.

FIG. 11 is a sectional view of an induction-type charging apparatus achieved by combining the charging port 10 shown in FIG. 10 and a charging coupling device, as shown in FIGS. 5 and 6. In the figure, the same reference numbers are assigned to components identical to those in FIGS. 5–7. As explained earlier, since the first core member 51 is provided with the indented grooves 108 and 109 extending around the middle leg portion 2 at the top surface 100 of the bottom plate portion 1, the heat generated at the winding 6 during a charge operation can be radiated through the indented grooves 108 and 109, to increase the charging power.

Figure 12:
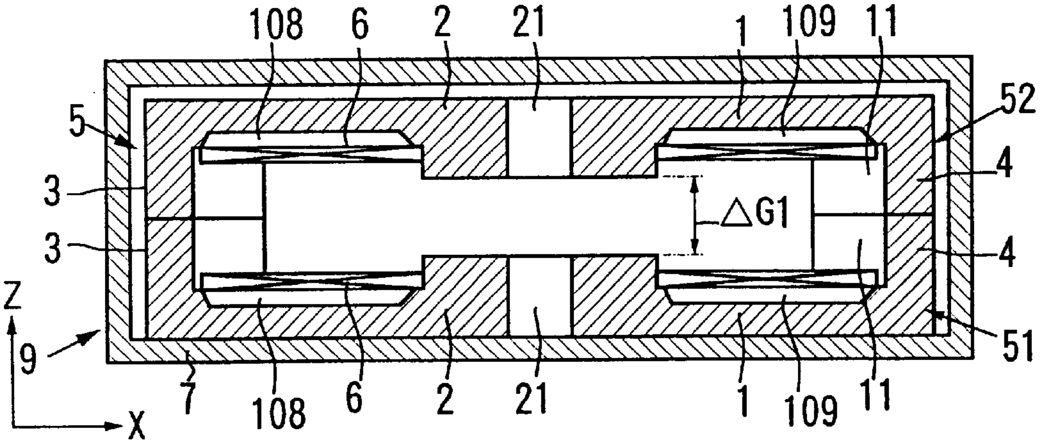
FIG. 12 is a sectional view of an embodiment of the charging port according to the present invention achieved by using two core members shown in FIGS. 8 and 9.

FIG. 12 presents a sectional view of a charging port achieved by utilizing the core member shown in FIGS. 8 and 9. In the embodiment shown in FIG. 12, the core member shown in FIGS. 8 and 9 is used to constitute both the first core member 51 and the second core member 52. Since the first and second core members 51 and 52 each has the indented grooves 108 and 109 extending around the middle leg portion 2, a heat radiation space is created by the indented grooves 108 and 109 between the winding wound around the middle leg portion 2, and the bottom plate 1.

Figure 13:
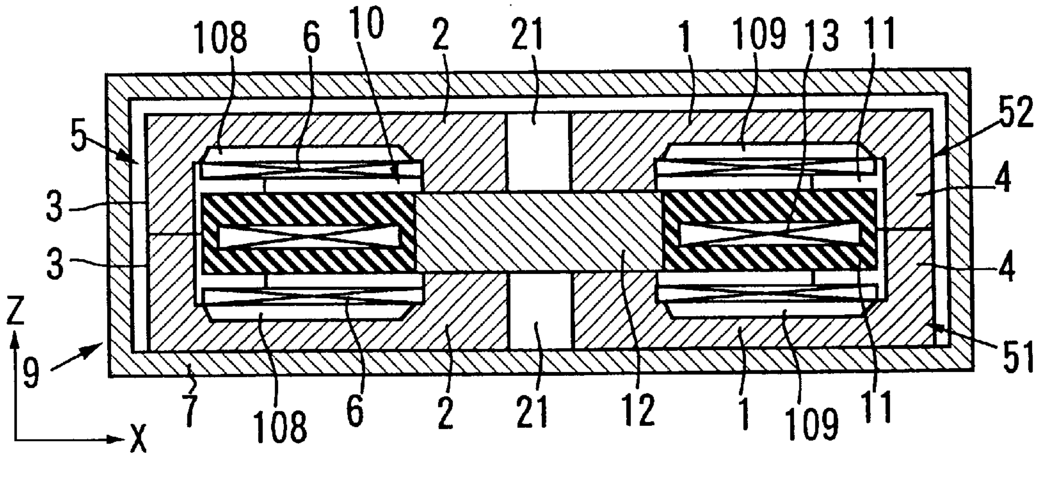
FIG. 13 is a sectional view of the induction-type charging apparatus according to the present invention having the charging port shown in FIG. 12.

FIG. 13 is a sectional view of an induction-type charging apparatus achieved by combining the charging port 12 shown in FIG. 12 and a charging coupling device, as shown in FIGS. 5 and 6. In the figure, the same reference numbers are assigned to components identical to those in FIGS. 5–7. As explained earlier, since the first and second core members 51 and 52 are each provided with the indented grooves 108 and 109 extending around the middle leg portion 2 at the top surface 100 of the bottom plate portion 1, the heat generated at the winding 6 during a charging operation can be radiated through the indented grooves 108 and 109 at the first core member 51 and the heat generated at the winding 13 of the charging coupling device 10 can be radiated through the indented grooves 108 and 109 of the second core member 52. As a result, the charging power can be further increased.

Figure 14:
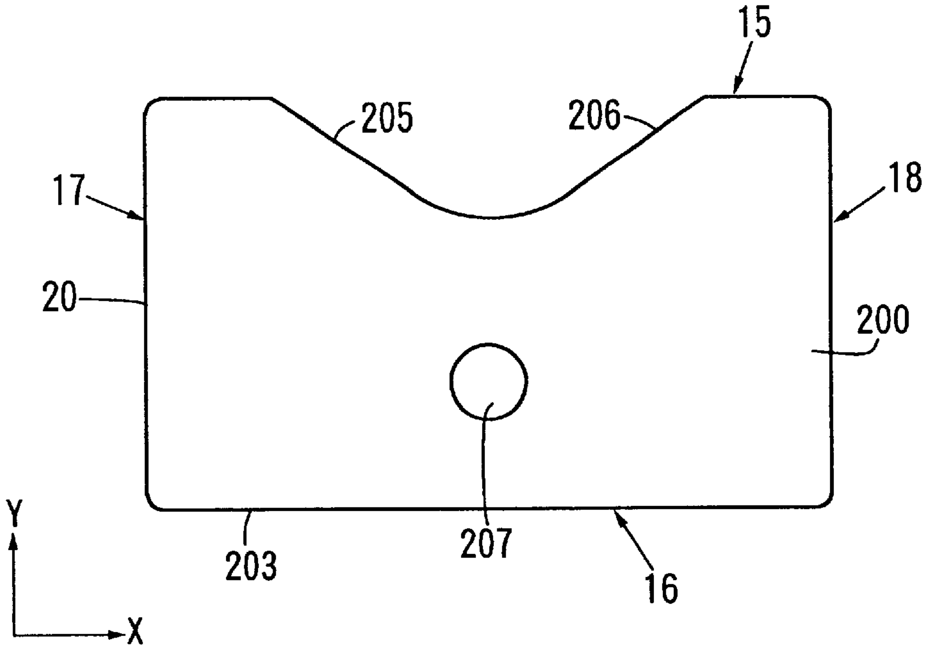
FIG. 14 is a plan view of the flat core member according to the present invention, which is utilized in conjunction with the core members shown in FIGS. 1, 2, 8 and 9.

FIG. 14 is a plan view of a core member which may be utilized in conjunction with the core members shown in FIGS. 1, 2, 8 and 9. This core member is a flat base 20 constituted of a ferrite molding and has a first direction Y and a second direction X perpendicular to the first direction Y. The bottom plate portion 1 has a first side end 15 and a second side end 16 opposing each other in the first direction Y and a third side end 17 and a fourth side end 18 opposing each other in the second direction X. The first side end 15 includes inclined side ends 205 and 206 which recede from the first side end 15 toward a point which is between the first side end 15 and the second side end 16 and halfway between the third side end 17 and the fourth side end 18. This flat core member has a planar shape roughly similar to the planar shape of the bottom plate portion 1 of the core member shown in FIGS. 1 and 2 or 8 and 9.

Figure 15:
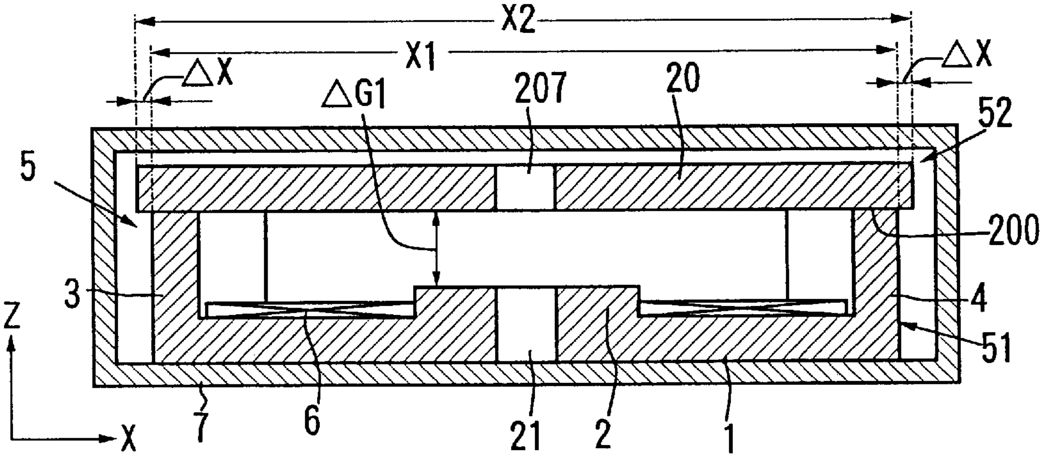
FIG. 15 is a sectional view of the charging port according to the present invention achieved by using the core member shown in FIGS. 1 and 2 and the flat core member shown in FIG. 14.

FIG. 15 is a sectional view of another embodiment of the charging port according to the present invention. In this embodiment, the second core member 52 is constituted of the flat core member shown in FIG. 14 and the first core member 51 is constituted of the core member shown in FIGS. 1 and 2.

The second core member 52 achieves a surface contact with the outer leg portions 3 and 4 of the first core member 51 to constitute a magnetic circuit. The second core member 52 faces opposite the top surface 201 of the middle leg portion 2 of the first core member 51 over a gap ΔG1. The charging coupling device is inserted at the gap ΔG1.

The second core member 52 has a slightly larger planar area than the first core member 51 and thus extends further outside beyond the ends of the first core member 51 along the lengthwise direction X and the widthwise direction Y. Its dimensions may be set so that when the first core member 51 has a length X1 along the lengthwise direction X, for instance, the second core member 52 has a length X2 larger than the length X1 to project out by ΔX on the two sides along the lengthwise direction X. Although not shown, along the widthwise direction Y, too, the second core member 52 projects out further than the first core member 51 on the two sides. With the first core member 51 and the second core member 52 sustaining such a dimensional relationship, a constant contact area can be maintained between the first core member 51 and the second core member 52 to constitute a stable magnetic circuit and assure stable characteristics even when inconsistency in the dimensions or assembly misalignment occurs with regard to the first core member 51 and the second core member 52 as long as the misalignment is contained within the range of the dimensional difference between them.

Figure 16:
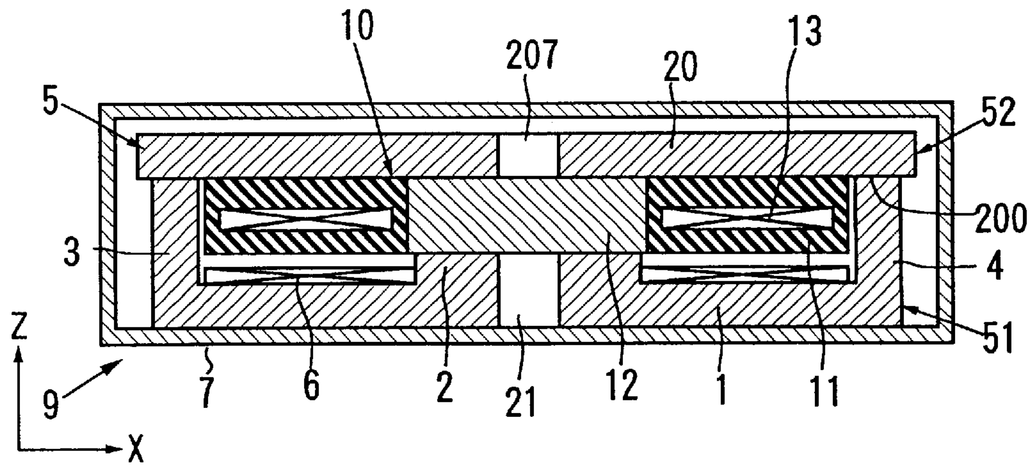
FIG. 16 is a sectional view of the induction-type charging apparatus according to the present invention achieved by combining the charging port shown in FIG. 15 with a charging coupling device.

FIG. 16 is a sectional view of an induction-type charging apparatus achieved by combining the charging port shown in FIG. 15 with the charging coupling device 10. The charging coupling device 10 is inserted between the middle leg portions 2 of the first core member 51 and the second core member 52 inside the charging port 9. Thus, an inductively coupled mechanism (transformer) is formed between the charging port 9 and the charging coupling device 10 to allow power to be transmitted from the charging coupling device 10 to the charging port 9.

Figure 17:
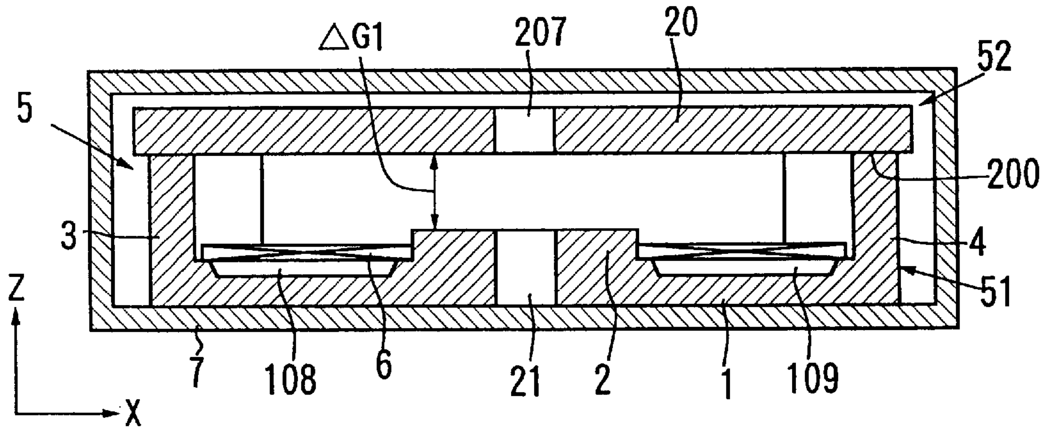
FIG. 17 is a sectional view of the charging port according to the present invention achieved by using the core member shown in FIG. 14 and the core member shown in FIGS. 8 and 9.

FIG. 17 is a sectional view of yet another embodiment of the charging port according to the present invention. In this embodiment, the second core member 52 is constituted of the flat core member shown in FIG. 14 and the first core member 51 is constituted of the core member shown in FIGS. 8 and 9. The relationship between the external dimensions of the first core member 51 and the second core member 52 is as explained in reference to FIG. 15. Since the first core member 51 is provided with the indented grooves 108 and 109 extending around the middle leg portion 2 at the top surface 100 of the bottom plate portion 1, the heat generated at the winding 6 during a charging operation is radiated through the indented grooves 108 and 109 to increase the charging power.

Figure 18:
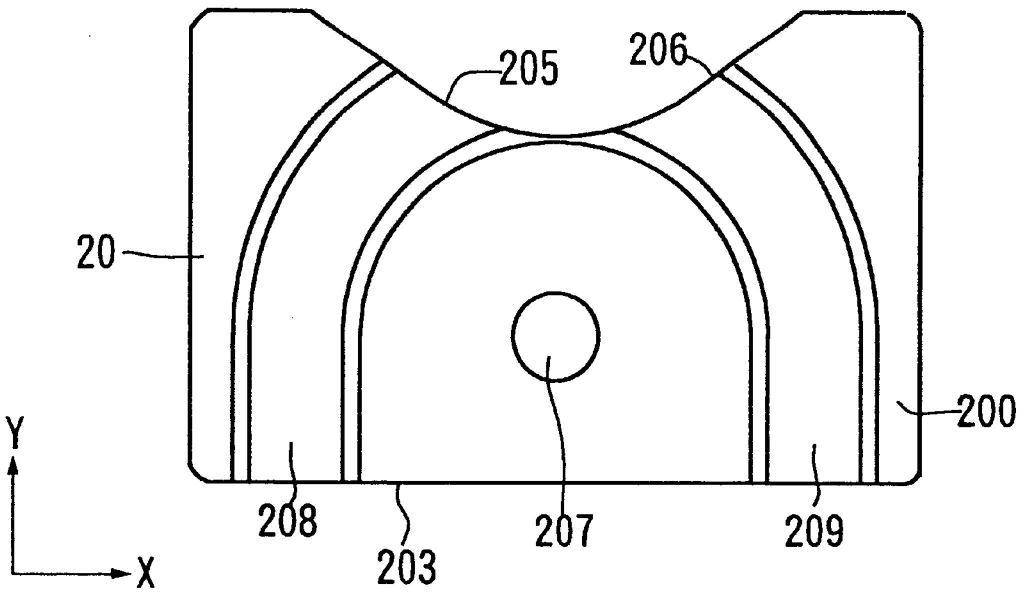
FIG. 18 is a plan view of another embodiment of the flat core member according to the present invention, which is used in conjunction with the core members shown in FIGS. 1, 2, 8 and 9.

FIG. 18 is a plan view of yet another embodiment of the flat core member which may be utilized in conjunction with the core members shown in FIGS. 1, 2, 8 and 9 and FIG. 19 is a front view of the flat core member shown in FIG. 18. In the figures, the same reference numbers are assigned to components identical to those in FIG. 14. This embodiment is characterized by indented grooves 208 and 209 provided at a surface 200 constituting a combining surface. The indented grooves 208 and 209 are formed in a circular arc around a hole 207.

Figure 19:
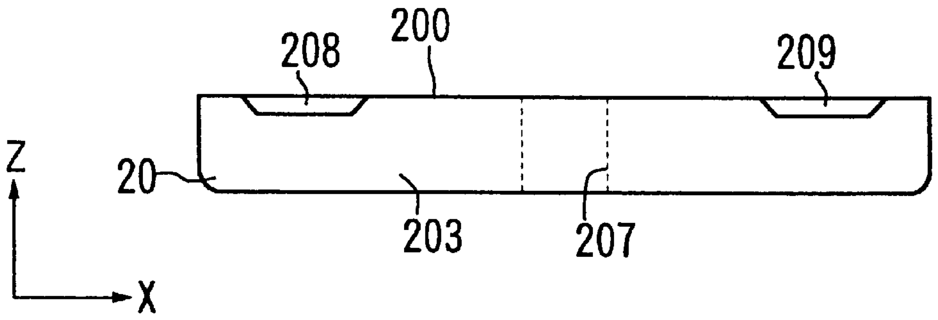
FIG. 19 is a front view of the flat core member shown in FIG. 18.
Figure 20:
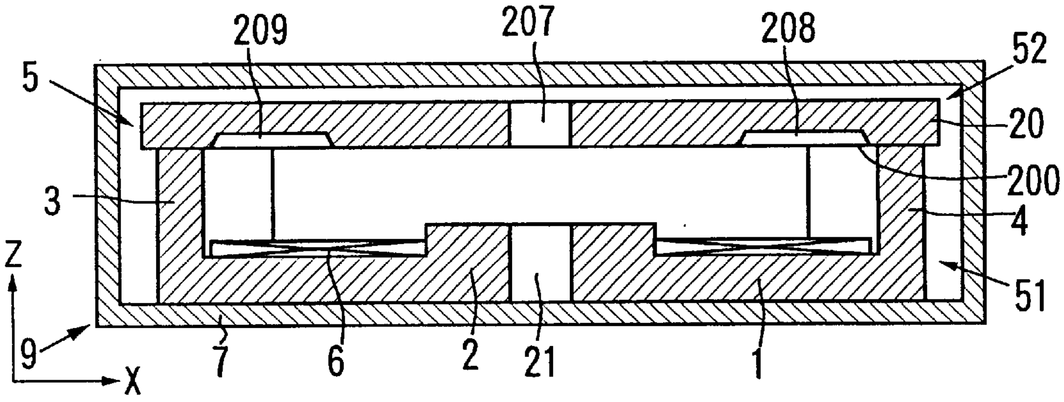
FIG. 20 is a sectional view of the charging port according to the present invention achieved by using the core member shown in FIGS. 18 and 19 and the core member shown in FIGS. 1 and 2.

FIG. 20 is a sectional view of a charging port achieved by using the flat core member shown in FIGS. 18 and 19 in combination with the core member shown in FIGS. 1 and 2. The first core member 51 is constituted of the core member shown in FIGS. 1 and 2.

Figure 21:
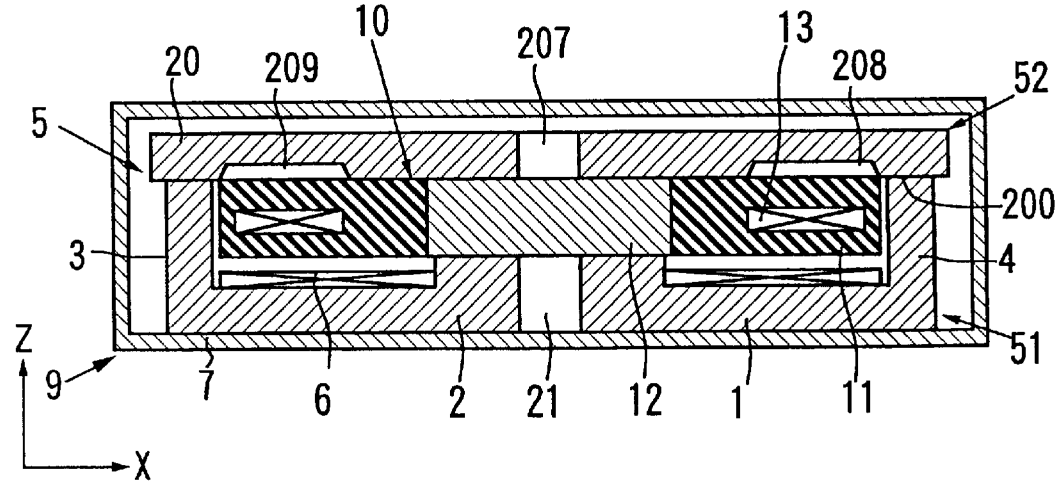
FIG. 21 is a sectional view of the induction-type charging apparatus according to the present invention achieved by combining the charging port shown in FIG. 20 with a charging coupling device.

The second core member 52 is constituted of the core member shown in FIGS. 18 and 19, with the surface 200 at which the indented grooves 208 and 209 are provided achieving a surface contact with the outer leg portions 3 and 4 of the first core member 51 to constitute a magnetic circuit. The second core member 52 faces opposite the top surface 201 of the middle leg portion 2 of the first core member 51 over a gap ΔG1. The charging coupling device is inserted at the gap ΔG1. FIG. 21 is a sectional view of an induction-type charging apparatus achieved by using the charging port shown in FIG. 20 and an inductive coupling device. Since the second core member 52 is provided with the indented grooves 208 and 209 at the surface 200, heat radiation space is created by the indented grooves 208 and 209 between a winding portion 11 of the charging apparatus 10 and the surface 200 of the second core member 52. Thus, the heat generated at the winding portion 11 can be radiated through the indented grooves 208 and 209 to limit the power restriction necessitated by the heat generation and increase the charging power capacity.

Figure 22:
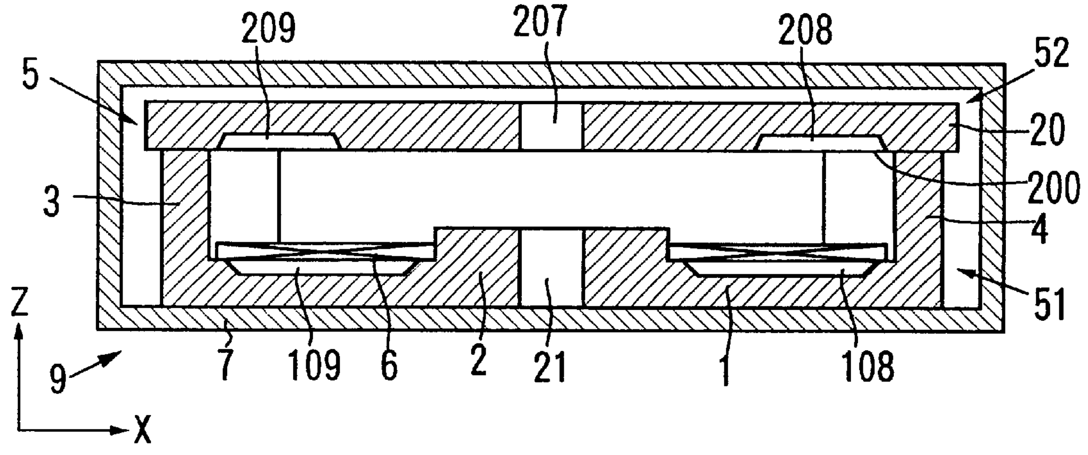
FIG. 22 is a sectional view of the charging port according to the present invention achieved by using the core member shown in FIGS. 18 and 19 and the core member shown in FIGS. 8 and 9.

FIG. 22 is a sectional view of a charging port achieved by using the flat core member shown in FIGS. 18 and 19 in combination with the core member shown in FIGS. 8 and 9. The core member shown in FIGS. 8 and 9 constitutes the first core member 51. The core member shown in FIGS. 18 and 19 constitutes the second core member 52.

The surface 200 of the second core member 52 at which the indented grooves 208 and 209 are provided achieves surface contact with the outer leg portions 3 and 4 of the first core member 51, to constitute a magnetic circuit. The second core member 52 faces opposite the top surface 201 of the middle leg portion 2 of the first core member 51 over the gap ΔG1. The charging coupling device is inserted at the gap ΔG1.

Figure 23:
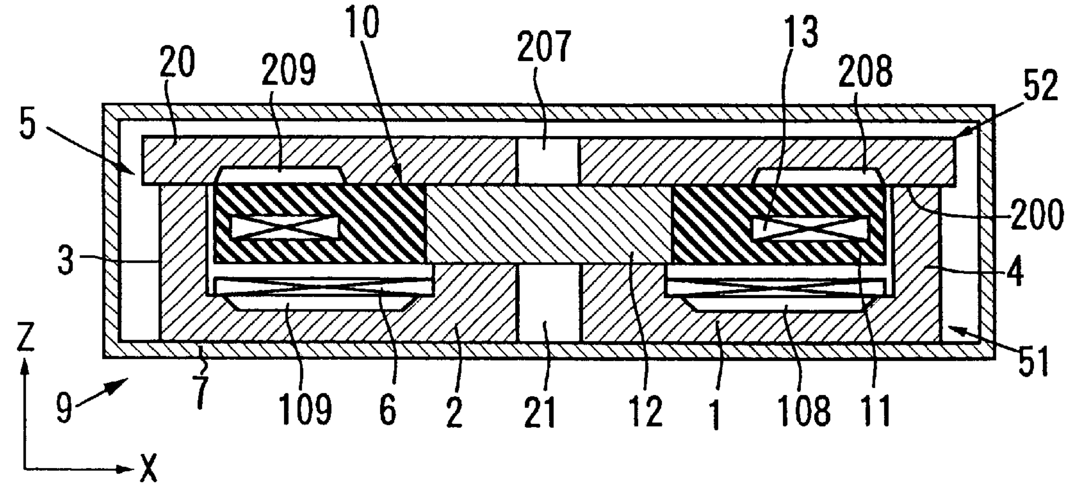
FIG. 23 is a sectional view of the induction-type charging apparatus according to the present invention achieved by combining the charging port shown in FIG. 22 with a charging coupling device.

FIG. 23 is a sectional view of an induction-type charging apparatus achieved by using the charging port shown in FIG. 22. Since the second core member 52 is provided with the indented grooves 208 and 209 at the surface 200, a heat radiation space is created by the indented grooves 208 and 209 between the winding portion 11 of the charging apparatus 10 and the surface 200 of the second core member 52. Thus, the heat generated at the winding portion 11 can be radiated through the indented grooves 208 and 209 to lessen the power restriction necessitated by the heat generation and increase the charging power capacity.

Furthermore, since the first core member 51 is provided with the indented grooves 108 and 109 extending around the middle leg portion 2 at the top surface 201 of the bottom plate portion 1, the heat generated at the winding 6 during a charging operation can be radiated through the indented grooves 108 and 109 of the first core member 51. Thus, the charging power can be further increased.

What is claimed is:

1. A core member comprising:

a bottom plate portion including a first side end and a second side end opposing each other in a first direction Y and a third side end and a fourth side end opposing each other in a second direction X perpendicular to said first direction Y, said first side end including inclined side ends receding from said first side end toward a point between said first side end and said second side end and halfway between said third side end and said fourth side end;

a middle leg portion extending from a top surface of said bottom plate portion in a third direction Z perpendicular to said first direction Y and said second direction X, offset toward said second side end, relative to a center of said bottom plate portion; and two outer leg portions extending from said top surface of said bottom plate portion in said third direction Z, along said third side end and said fourth side end, and having top surfaces being higher than a top surface of said middle leg portion.

2. The core member of claim 1, wherein:

said outer leg portions each have at least a portion of an inner surface thereof formed in a circular arc shape.

3. The core member of claim 1, wherein;

said bottom plate portion is provided with an indented groove extending around said middle leg portion on said top surface.

4. A flat core member utilized in combination with the core member of claim 1.

5. The flat core member of claim 4 having an indented groove at a combining surface.

6. A core assembly, comprising;

a first core member that includes;

a bottom plate portion including a first side end and a second side end opposing each other in a first direction Y and a third side end and a fourth side end opposing each other in a second direction X perpendicular to said first direction Y, said first side end including inclined side ends receding from said first side end toward a point between said first side end and said second side end and halfway between said third side end and said fourth side end;

a middle leg portion extending from a top surface of said bottom plate portion in a third direction Z perpendicular to said first direction Y and said second direction X, offset toward said second side end, relative to a center of said bottom plate portion;

two outer leg portions extending from said top surface of said bottom plate portion in said third direction Z, along said third side end and said fourth side end, and having top surfaces being higher than a top surface of said middle leg portion; and a second core member utilized in combination with said first core member.

7. The core assembly of claim 6, wherein;

said outer leg portions of said first core member each have at least a portion of an inner surface thereof formed in a circular arc shape.

8. The core assembly of claim 6, wherein;

said bottom plate portion of said first core member is provided with an indented groove extending around said middle leg portion on said top surface.

9. The core assembly of claim 6, wherein;

said second core member includes;

a bottom plate portion including a first side end and a second side end opposing each other in a first direction Y and a third side end and a fourth side end opposing each other in a second direction X perpendicular to said first direction Y, said first side end including inclined side ends receding from said first side end toward a point between said first side end and said second side end and halfway between said third side end and said fourth side end;

a middle leg portion extending from a top surface of said bottom plate portion in a third direction Z perpendicular to said first direction Y and said second direction X, offset toward said second side end, relative to a center of said bottom plate portion;

two outer leg portions extending from said top surface of said bottom plate portion in said third direction Z, along said third side end and said fourth side end, and having top surfaces being higher than a top surface of said middle leg portion; and said first core member and said second core member are assembled so as to allow said middle leg portions to face opposite each other and said outer leg portions to face opposite each other.

10. The core assembly of claim 9, wherein;

said outer leg portions of said second core member each have at least a portion of an inner surface there of formed in a circular arc shape.

11. The core assembly of claim 9, wherein;

said bottom plate portion of said second core member is provided with an indented groove extending around said middle leg portion on said top surface.

12. The core assembly of claim 6, wherein;

said second core member is constituted of a flat core member.

13. The core assembly of claim 12, wherein;

said second core member is provided with an indented groove at a combining surface.

14. The core assembly of claim 12, wherein;

a planar area of said second core member is set larger than a planar area of said first core member.

15. A charging port comprising:

a core assembly provided with a first core member that includes;

a bottom plate portion including a first side end and a second side end opposing each other in a first direction Y and a third side end and a fourth side end opposing each other in a second direction X perpendicular to said first direction Y, said first side end including inclined side ends receding from said first side end toward a point between said first side end and said second side end and halfway between said third side end and said fourth side end;

a middle leg portion extending from a top surface of said bottom plate portion in a third direction Z perpendicular to said first direction Y and said second direction X, offset toward said second side end, relative to a center of said bottom plate portion;

two outer leg portions extending from said top surface of said bottom plate portion in said third direction Z, along said third side end and said fourth side end, and having top surfaces being higher than a top surface of said middle leg portion;

a second core member utilized in combination with said first core member;

a winding wound around said middle leg portion of said core assembly; and a case having said core members and said winding housed therein and having an opening corresponding to said gap.

16. The charging port of claim 15, wherein;

said outer leg portions of said first core member each have at least a portion of an inner surface thereof formed in a circular arc shape.

17. The charging port of claim 15, wherein;

said bottom plate portion of said first core member is provided with an indented groove extending around said middle leg portion on said top surface.

18. The charging port of claim 15, wherein;

said second core member includes;

a bottom plate portion including a first side end and a second side end opposing each other in a first direction Y and a third side end and a fourth side end opposing each other in a second direction X perpendicular to said first direction Y, said first side end including inclined side ends receding from said first side end toward a point between said first side end and said second side end and halfway between said third side end and said fourth side end;

a middle leg portion extending from a top surface of said bottom plate portion in a third direction Z perpendicular to said first direction Y and said second direction X, offset toward said second side end, relative to a center of said bottom plate portion;

two outer leg portions extending from said top surface of said bottom plate portion in said third direction Z, along said third side end and said fourth side end, and having top surfaces being higher than a top surface of said middle leg portion; and said first core member and said second core member are assembled to as to allow said middle leg portions to face opposite each other and said outer leg portions to face opposite each other.

19. The charging port of claim 18, wherein;

said outer leg portions of said second core member each have at least a portion of an inner surface thereof formed in a circular arc shape.

20. The charging port of claim 18, wherein;

said bottom plate portion of said second core member is provided with an indented groove extending around said middle leg portion on said top surface.

21. The charging port of claim 15, wherein;

said second core member is constituted of a flat core member.

22. The charging port of claim 21, wherein;

said second core member is provided with an indented groove at a combining surface.

23. The charging port of claim 21, wherein;

a planar area of said second core member is set larger than a planar area of said first core member.

24. An induction-type charging apparatus that includes a charging port comprising:

a core assembly provided with a first core member that includes;

a bottom plate portion including a first side end and a second side end opposing each other in a first direction Y and a third side end and a fourth side end opposing each other in a second direction X perpendicular to said first direction Y, said first side end including inclined side ends receding from said first side end toward a point between said first side end and said second side end and halfway between said third side end and said fourth side end;

a middle leg portion extending from a top surface of said bottom plate portion in a third direction Z perpendicular to said first direction Y and said second direction X, offset toward said second side end, relative to a center of said bottom plate portion;

two outer leg portions extending from said top surface of said bottom plate portion in said third direction Z, along said third side end and said fourth side end, and having top surfaces being higher than a top surface of said middle leg portion;

a second core member utilized in combination with said first core member;

a winding wound around said middle leg portion of said core assembly;

a case having said core members and said winding housed therein and having an opening corresponding to said gap; and a charging coupling device that supplies electrical energy to said charging port through inductive coupling.

25. The induction-type charging apparatus of claim 24, wherein;

said outer leg portions of said first core member each have at least a portion of an inner surface thereof formed in a circular arc shape.

26. The induction-type charging apparatus of claim 24, wherein;

said bottom plate portion of said first core member is provided with an indented groove extending around said middle leg portion on said top surface.

27. The induction-type charging apparatus of claim 24, wherein;

said second core member includes;

a bottom plate portion including a first side end and a second side end opposing each other in a first direction Y and a third side end and a fourth side end opposing each other in a second direction X perpendicular to said first direction Y, said first side end including inclined side ends receding from said first side end toward a point between said first side end and said second side end and halfway between said third side end and said fourth side end;

a middle leg portion extending from a top surface of said bottom plate portion in a third direction Z perpendicular to said first direction Y and said second direction X, offset toward said second side end, relative to a center of said bottom plate portion;

two outer leg portions extending from said top surface of said bottom plate portion in said third direction Z, along said third side end and said fourth side end, and having top surfaces being higher than a top surface of said middle leg portion; and said first core member and said second core member are assembled to as to allow said middle leg portions to face opposite each other and said outer leg portions to face opposite each other.

28. The induction-type charging apparatus of claim 27, wherein;

said outer leg portions of said second core member each have at least a portion of an inner surface thereof formed in a circular arc shape.

29. The induction-type charging apparatus of claim 27, wherein;

said bottom plate portion of said second core member is provided with an indented groove extending around said middle leg portion on said top surface.

30. The induction-type charging apparatus of claim 24, wherein;

said second core member is constituted of a flat core member.

31. The induction-type charging apparatus of claim 30, wherein;

said second core member is provided with an indented groove at a combining surface.

32. The induction-type charging apparatus of claim 30, wherein;

a planar area of said second core member is set larger than a planar area of said first core member.

* * * * *